Nov. 18, 1930.  B. B. BACHMAN ET AL  1,782,187
INTERNAL COMBUSTION ENGINE
Filed July 18, 1928   3 Sheets-Sheet 1

INVENTORS
Benjamin B. Bachman and
BY Louis S. Clarke
P. Frank Smith
ATTORNEY

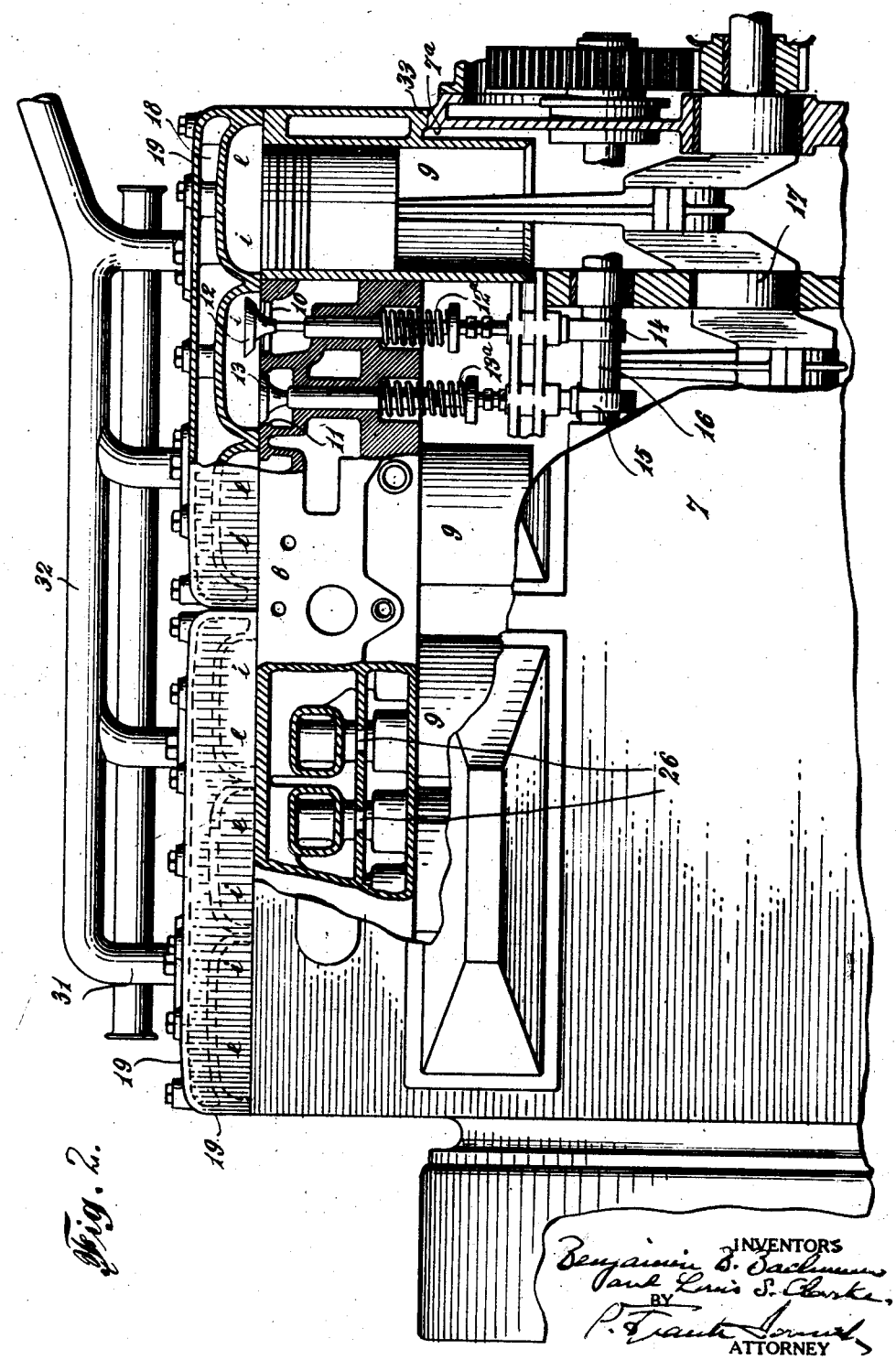

Nov. 18, 1930.   B. B. BACHMAN ET AL   1,782,187
INTERNAL COMBUSTION ENGINE
Filed July 18, 1928   3 Sheets-Sheet 3
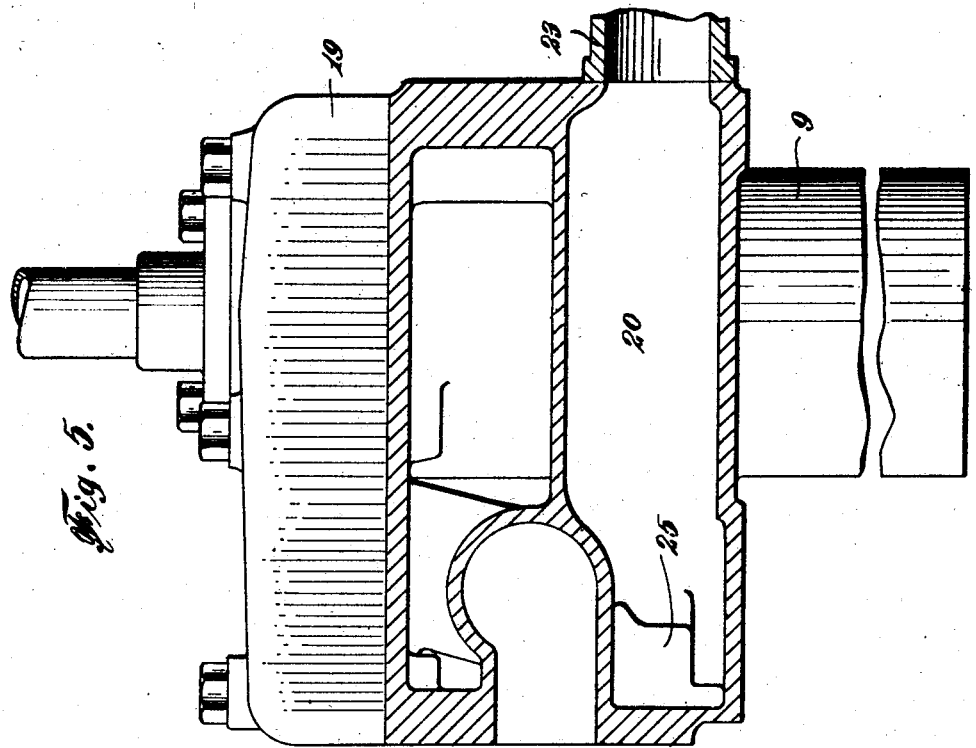
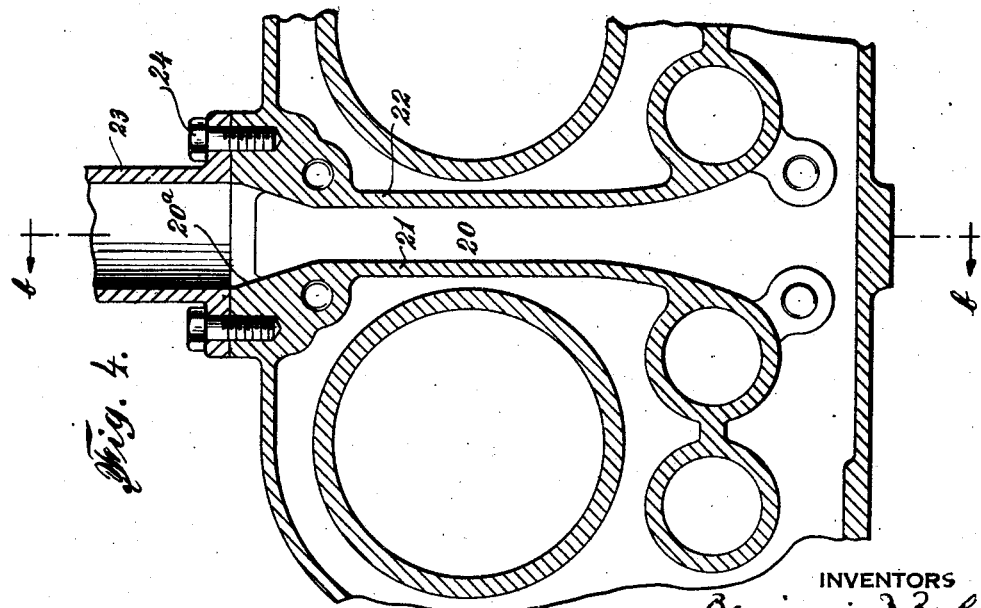
INVENTORS
Benjamin B. Bachman
Louis S. Clark
BY
ATTORNEY Patented Nov. 18, 1930

1,782,187

UNITED STATES PATENT OFFICE

BENJAMIN B. BACHMAN, OF PHILADELPHIA, PENNSYLVANIA, AND LOUIS S. CLARKE, OF PALM BEACH, FLORIDA, ASSIGNORS TO THE AUTOCAR COMPANY, OF ARDMORE, PENNSYLVANIA, A CORPORATION OF PENNSYLVANIA

INTERNAL-COMBUSTION ENGINE

Application filed July 18, 1928. Serial No. 293,683.

This invention relates generally to internal combustion engines, especially those of the so-called water-cooled types, and is more particularly directed to improvements in the methods and means of circulating the cooling fluid through the engine, so as to attain greater cooling efficiency than is possible with the systems or methods of circulation now in use.

As is well known, the standard practice in the water-cooling of hydrocarbon engines involves carrying water from a suitable radiator or cooling unit, to jackets surrounding the engine cylinders and valve seats, the water, after performing its function, returning to the radiator, this circuit of the liquid continuing during the operation of the engine. In some systems, forced circulation is utilized, a pump being inserted in the water line from the bottom of the radiator to the engine jacketing, while in others, the so-called thermo-siphon system, a natural circulation is induced by the differential in temperature between the fluid in the jackets and that in the radiator. In either type, the water enters the engine jackets from the lower part of the radiator and returns to the top thereof after flowing through the water jacket passages of the cylinder block and the head.

To obtain the most efficient performance in an internal combustion engine, which is essentially a heat motor, it is desirable that the combustion chamber be maintained at the highest possible temperature below that which would result in preignition of the entering fuel charge. However, the operation of the engine under such conditions, with existing methods of jacketing and systems of cooling, results in the rapid deterioration of the exhaust valve seats and the valves themselves, due to the extremely high temperature of the spent gases passing thereover to the exhaust manifold. For example, the valve seats and the chamfered edges or seat-engaging portions of the valves become burned and pitted, while the valves, in many instances, warp or become distorted, resulting in compression losses with a consequent rapid decline in the operating efficiency of the motor. Obviously, this necessitates frequent overhaul, with the accompanying economic loss.

Many attempts have been made to accomplish the desired cooling of the exhaust valves and their seats, without producing undue heat losses in the upper cylinder walls and head, but these have resulted in failure, from one cause or another; largely due to production complications, with the undesirable high manufacturing costs, or lack of dependability in functioning.

Therefore, it is the primary object of this invention to provide a simple, practical and efficient method and means of cooling the exhaust valve seats, and the valves associated therewith, in an internal combustion engine, without detracting from the performance of the engine, by producing detrimental heat losses at those points where high and substantially constant temperatures are essential to economic operation.

It is also an object of this invention to provide for the cooling of the exhaust valves and their seats through the medium of a fluid circulating through the cooling system, in a manner whereby such fluid will perform its function with respect to said valves and their seats, while its effective capacity for absorption of heat units is greatest.

Another object of the invention resides in the provision of means for practicing a method of cooling an internal combustion engine, as aforesaid, which may be practically and economically produced as an integral part of the so-called cylinder block, and without altering or changing the general appearance of the motor, so that in all visible essentials it conforms to existing standards of engine design.

This invention further contemplates the provision of a cooling method and means for internal combustion engines, having the aforesaid characteristics, which will be dependable in functioning, under the variable conditions of engine operation.

Another important object of the invention resides in the provision of a more compact and rigid structure, than is obtainable in many of the engines of existing design, and especially those used in motor-vehicle construction, thereby minimizing the detrimental effects of vibration and greatly adding to the life of the motor.

Other objects and advantages flowing from the practicing of our invention, will doubtless present themselves as the description proceeds, and we would have it clearly understood that we reserve unto ourselves all rights to the full range of equivalents, both in structure and in use, to which we may be entitled under our invention in its broadest aspect.

For the purposes of this disclosure, we have elected to illustrate and describe a certain preferred means of carrying our method into effect. However, this is merely illustrative, as our method may be practiced by other means within the spirit and scope of the appended claims.

In the accompanying drawings:

Figure 2 is a side elevation, partly in section, embodying the block construction shown in Figure 1, the passages of two of the exhaust valves and the adjacent portions of the water jacketing being viewed on the line a—a of Figure 1.

Figure 4 is a transverse horizontal sectional view of a fragment of the cylinder block, showing the water inlet to the jacketing communicating with a passage disposed approximately on the transverse center line of the block, or between the third and fourth cylinders, and Figure 5 is a sectional elevation of the block, taken on the line b—b of Figure 4.

Figure 3:
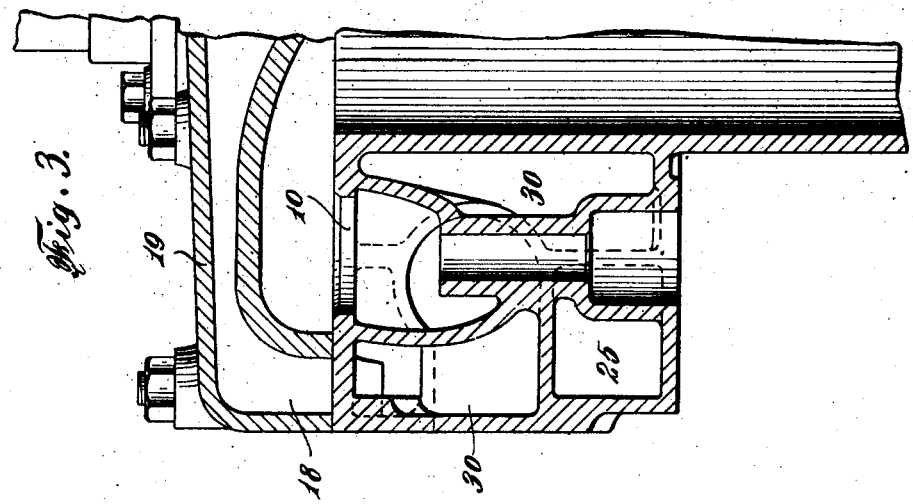
Figure 3 is a transverse vertical section of a part of the cylinder block, showing an intake valve passage and the water passages of the block and head jacketing.

Referring now to the drawings in detail, in which like characters of reference are employed to designate similar parts in the several views, 7 indicates the engine crank-case upon which the engine block is mounted and secured by suitable bolts or studs. This block 8, which may be cast or formed in any other suitable manner, may comprise any practicable number of cylinders, the engine in the present showing being of the so-called L-head type, with six cylinders in line.

The block embodies the cylinder barrels 9, inlet valve seats 10 and exhaust valve seats 11 with which the inlet valves 12 and the exhaust valves 13 are adapted to cooperate, the valves being actuated in opposition to their springs $12^a$ and $13^a$ by the cams 14 and 15 on the cam shaft 16, rotating in proper synchronism with the revolution of the crank shaft 17.

The aforesaid cylinder barrels 9, are surrounded by walls spaced therefrom to provide passages for the circulation of a cooling fluid, such as water, thereabout, these passages communicating through suitable registering openings with like water circulation passages 18 in the detachable cylinder head sections 19. In the usual construction, the cooling liquid is admitted to the cylinder jacket at the front end of the block, at approximately the base thereof, and rising therewithin around the barrels and the valve seats and inlet and exhaust passages, returns to the radiator through suitable connections to ports in the tops of the respective head sections.

Now, when it is considered that the exhaust valve seats are the most critical portions of the block requiring cooling, due to the high temperature of the spent gases rushing over them, it must be apparent that while too rapid cooling of the walls of the combustion chamber may not be desirable, in the interests of volumetric efficiency, the existing uncontrolled or undirected circulation of the cooling fluid within the jacketing is not productive of the greatest efficiency in engine performance nor is it conducive to that long life of the exhaust valves and their seats which economic maintenance demands.

Therefore, we have provided for carrying or conducting the cooling medium to those parts of the engine block where the heat hazard is greatest, while the heat absorption capacity of the water is virtually at its maximum, instead of at a minimum, as it now reaches the exhaust valve seats, and, we accomplish this desirable end without the objectionable rapid cooling of the walls of the combustion chamber, so that the high performance characteristics of a given design of engine may be retained, without detrimentally affecting the life of the exhaust valves and their seats. This result may be attained in accordance with our invention in various simple and practical ways, one means of practicing our method of cooling involving the delivery of the cooling fluid from the radiator directly to the exhaust valve seats and passages, from where it circulates about the remainder of the water jacketing and returns to the top of the radiator.

As will be observed from Figure 4 of the drawings, a passage 20, defined by the spaced walls 21 and 22 disposed transversely of the cylinder block and preferably between the two intermediate cylinders of the set of six, which is open at one end to the outside of the block, as indicated at $20^a$. This passage 20, which may be located between the first and second cylinders or elsewhere in the block, is adapted to be connected to the pump line, or to the line from the lower part of the radiator (not shown), as the case may be, by suitable flanged fitting 23, bolted to the block, as at 24.

The said passage 20, as will be seen from Figure 4, merges or opens into a second, or longitudinally disposed, passage 25, which, in the embodiment of our invention illustrated, is closed at each end, the said passage 25 which is an integral component of the cylinder block water jacketing forming a part of a single circulating system, as will be hereinafter apparent, being located on the valve side of the engine.

The passage 25, which it will be observed is below the valves, may be of any suitable shape and dimensions, essential to the proper performance of its functions in the directing of the flow of the circulating medium, the walls 21 and 22 forming the passage 20, being curved or otherwise formed, as at 21ª and 22ª, to eliminate friction and the creation of eddies as the water traversing the passage 20 from the inlet 20ª enters the passage 25.

Now, assuming that the engine is operating, the water in the cooling system, that is, the engine block jacketing, including the head, the radiator, the interconnecting outlet and return lines, as well as in the pump, if one is a part of the system, is in continuous circulation from the base of the radiator to the engine and back again to the top of the radiator. As the heat-laden water passes through the radiator, it is subjected to cooling so that it reenters the engine block at a substantially reduced temperature, one which renders it again effective in the performance of its cooling function.

Figure 1:
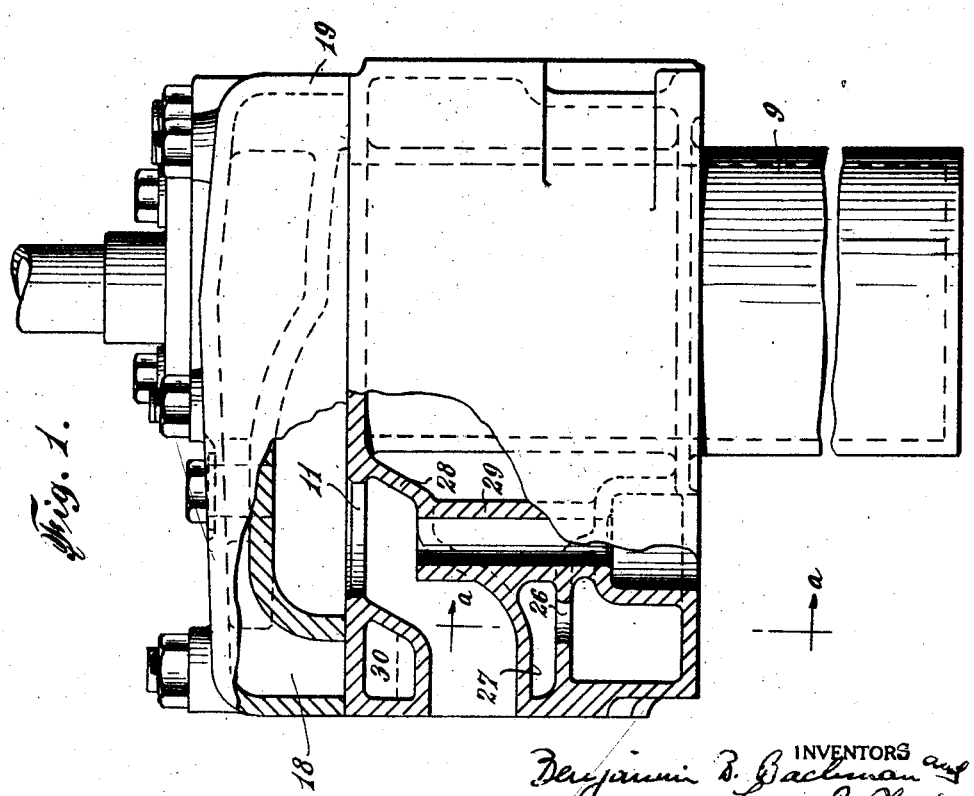
Figure 1 is an end elevation of the cylinder block of an internal combustion engine, partly in section, showing an exhaust valve passage and cooperating passages for the cooling medium, in accordance with our invention.

This relatively cool water, as has been explained, is carried directly to the passage 20, from which it flows into the passage 25, and rises through cored or otherwise formed openings or vents 26 in the top wall 25ª thereof, one of these openings being preferably located beneath the lowest point of the wall of each exhaust valve passage, as indicated at 27, in Figure 1. It will be apparent that the liquid rising through these apertures, which provide the only outlets from the passage 25 to the remainder of the water jacketing of the engine block, will be directed against the walls of the respective exhaust valve passages. Thus, the most critical portions of the engine block, the exhaust valve seats 11 and the exhaust valve passages 28, as well as the exposed surfaces of the valve stem guides 29, are subjected to the cooling influence of the circulating liquid, while it is at its maximum heat absorbing capacity, with the advantageous results hereinbefore pointed out. If desired, and where practicable, in lieu of the openings 26, suitable nozzles or other types of outlets for directing or controlling the flow of water from the passage 25, as described, may be employed.

The water, continuing to circulate through the various intercommunicating passages 30 of the jacketing of the cylinder block, enters the jacketing 18 of the head and issues therefrom to the risers 31 communicating with the return pipe 32, by which delivery to the top of the radiator is effected and the circuit completed. As the water reaches the walls of the combustion chamber, it has absorbed sufficient heat units to reduce its absorption capacity to a degree whereby the walls of said chamber will be maintained at a most efficient operating temperature.

It will be noted, that, in mounting the cylinder block 8 upon the crank-case 7, the lower ends of the cylinder barrels 9 project a considerable distance into said case, the base of the water-jacketing, as indicated at 33, cooperating with the top flange 7ª of the crank-case to form the supporting means for said block. Any suitable means, as bolts or studs, cooperating with the block and with the crank-case, may be provided to render these units of the engine relatively immovable.

By extending the cylinder barrels into the crank-case, instead of supporting the block upon the latter by the usual flanges formed at the base of the barrels and spaced downwardly from the bottom of the jacketing of the block, the height of the cylinder block above the crank-case is appreciably shortened, not only producing a more compact structure, but one which possesses greater rigidity and resistance to the tendency of relative vibration of the block and crank-case, with the resulting detrimental effects. Also, with the accompanying increase in the depth of the crank-case, greater freedom in design is allowed for the location of oil-pumps and other crank-case-contained accessories.

While, as before stated, we have confined this disclosure, more or less, to the practicing of our method with a structure such as is illustrated, the desired results may be obtained by other means and arrangements of cooperating structural elements. For example, the passage 20, instead of being at a right angle to, and in the horizontal plane of, the passage 25, as shown, may be disposed at any other suitable angle relative to the latter and above or below it, or the major portion of said passage 20 may parallel the passage 25 with a suitable offset connection to the latter. Also, in lieu of the passage 20 communicating with the passage 25 approximately on the transverse center line of the block, as shown, the former may open into the latter at any other point intermediate the ends of the longitudinal passage, or at either or both ends thereof, as may be found desirable or necessary in any particular design of engine.

From the foregoing, it will be manifest that our invention possesses a wide range of applicability in the internal combustion engine art and that various means may be utilized for attaining the objects to which it is directed, as hereinbefore set forth, within the purview of the following claims.

We claim:

1. In an internal combustion engine having a water jacket, the combination of a passage disposed longitudinally within said jacket, and at the lowest part thereof, means communicating with said passage and with a water cooling unit for delivering the cooled water directly from said unit to said passage and means for ejecting the water from said passage into said water jacket beneath the exhaust valves, whereby said valves and their seats will be subjected to the cooling influence of the water received from the cooling unit while the heat absorption capacity of the liquid is greatest.

2. A water jacket for the cylinder block of an internal combustion engine having a passage enclosed within and disposed transversely of the block and open at one end to the exterior thereof, a second passage within the water jacketing of said block extending longitudinally thereof and closed at each end, said second passage having communication with the first passage, and a plurality of outlets formed in the top of the second passage, each being located directly below an exhaust valve of the cylinder block, said outlets forming the sole means of communication between said transverse passage and the water jacketing.

3. A water jacket for the cylinder block of an internal combustion engine, having a plurality of communicating passages for conducting a cooling fluid about the cylinder barrels and the inlet and exhaust valve passages, a passage disposed transversely of said block at the base thereof and within the confines of said water jacket, said latter passage being connectible to a radiator, a passage within the water jacket disposed at right angles to said transverse passage and in the horizontal plane thereof on the valve side of the motor, and a plurality of outlets from said last named passage to the remainder of the water jacket of the cylinder block.

4. A water jacket for the cylinder block of an internal combustion engine, having a plurality of communicating passages for conducting a cooling liquid about the cylinder block and inlet and exhaust valve chambers, a T-shaped passage located in the base of said water jacket open at one end to the exterior of the block, the head of said passage lying along the valve side of said block, and a plurality of outlets from the head of said passage adapted to direct the water issuing therefrom upwardly into the contiguous part of the cylinder block water jacket for circulation through said water jacket.

5. An internal combustion engine having a crank-case, a cylinder block embodying a water jacket surrounding the cylinder barrels, the base of said jacket being spaced upwardly from the lower ends of the cylinder barrels, a pair of communicating passages disposed at right angles to each other within said water jacket, one of said passages extending to the exterior of the cylinder block and embodying means whereby connection may be made therefrom to a water cooling radiator, the other of said passages having water outlets communicating with the remainder of said water jacket directly beneath the walls of the respective exhaust valve chambers.

6. The combination with the cylinder block of an internal combustion engine embodying a water jacket, of a long relatively narrow passage disposed longitudinally of the block at the base of the water jacket and within the latter, said passage being located on the valve side of the block, a second passage communicating with the exterior of the block and with said first-described passage intermediate the ends of the latter and a plurality of openings in the top of said first-described passage, one directly beneath each exhaust valve seat, said openings forming the sole means for admitting a cooling liquid to said water jacket.

7. The combination with the cylinder block of an internal combustion engine, embodying a water jacket, of a passage wholly contained within said jacket and situated at the lowest point thereof, said passage extending from end to end of said block beneath the valve chambers therein, means for admitting water to said passage at a point intermediate its ends and means for discharging the water admitted to said passage into the surrounding water jacket, said latter means comprising an opening in the roof of said passage located beneath each exhaust valve seat.

8. The combination with the cylinder block of an internal combustion engine embodying a water jacket, of a pair of connected passages wholly contained within said water jacket, one of said passages being disposed longitudinally of the block on the valve side thereof and closed except for an opening in the wall thereof beneath each exhaust valve seat, the other of said passages being open to the exterior of said block for connection to a source of water supply.

BENJAMIN B. BACHMAN.
LOUIS S. CLARKE.